United States Patent [19]
Martin et al.

[11] 4,167,144
[45] Sep. 11, 1979

[54] BUCKLE SUPPORTING AND ANTI-PILFERING ASSEMBLY

[75] Inventors: Leslie W. Martin, Lansing; Richard A. LeBeau, Palos Heights, both of Ill.

[73] Assignee: Unarco Industries, Inc., Chicago, Ill.

[21] Appl. No.: 834,417

[22] Filed: Sep. 19, 1977

[51] Int. Cl.² ............ B60P 7/08; B60P 7/14; B61D 45/00; B61D 49/00

[52] U.S. Cl. ............ 105/467; 24/163 R; 105/376; 105/474; 105/489; 105/493; 280/179 A

[58] Field of Search ............ 24/74 R, 163 R; 105/376, 466, 467, 474, 486, 487, 488, 489, 490, 493, 494, 495, 496, 497, 498, 502, 503; 244/188 R; 280/179 A

[56] References Cited

U.S. PATENT DOCUMENTS

| Re. 28,788 | 4/1976 | Williamson | 105/376 X |
|---|---|---|---|
| 1,719,029 | 7/1929 | Starmer | 24/163 R |
| 1,756,706 | 4/1930 | Strufe | 105/376 |
| 2,913,216 | 11/1959 | Davis | 105/466 |
| 3,099,313 | 7/1963 | Peck et al. | 105/467 |
| 3,294,034 | 12/1966 | Bodenheimer et al. | 105/376 X |
| 3,486,723 | 12/1969 | Harrison | 244/118 R |

Primary Examiner—Albert J. Makay
Assistant Examiner—Howard Beltran
Attorney, Agent, or Firm—Norman Lettvin; Gerald S. Geren

[57] ABSTRACT

There is disclosed herein a buckle support system for use with a curtain-style lading-restraining device of the type which is suspended from an overhead support and includes a plurality of vertically-spaced and laterally-extending restraining belts, each of which includes a buckle for tightening the belt. A cable system is provided which is secured at its uppermost end to the overhead support and which connects to each buckle. Stop sleeves are secured or crimped to the cable at positions to engage and support each buckle so that the weight of the buckle is carried by the overhead support through the cable system. This system, in addition to supporting the weight of the buckles, deters buckle theft or removal, since in order to obtain the buckle, the belts and the cable must be severed.

6 Claims, 4 Drawing Figures

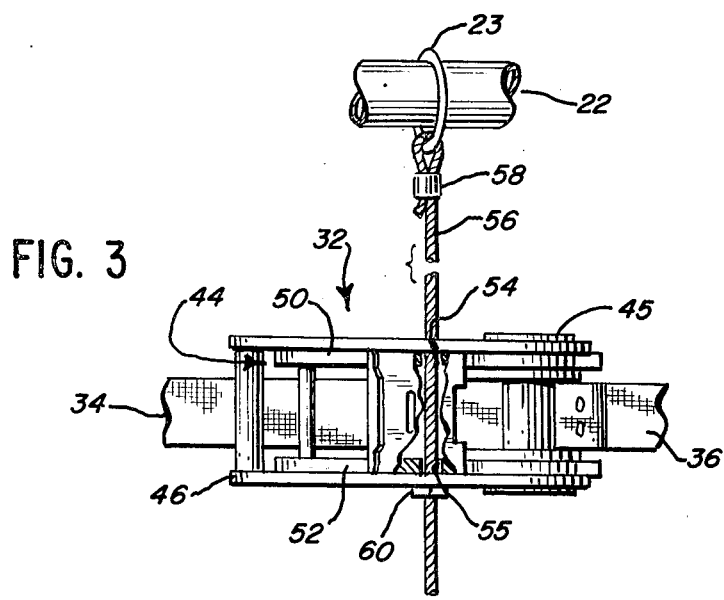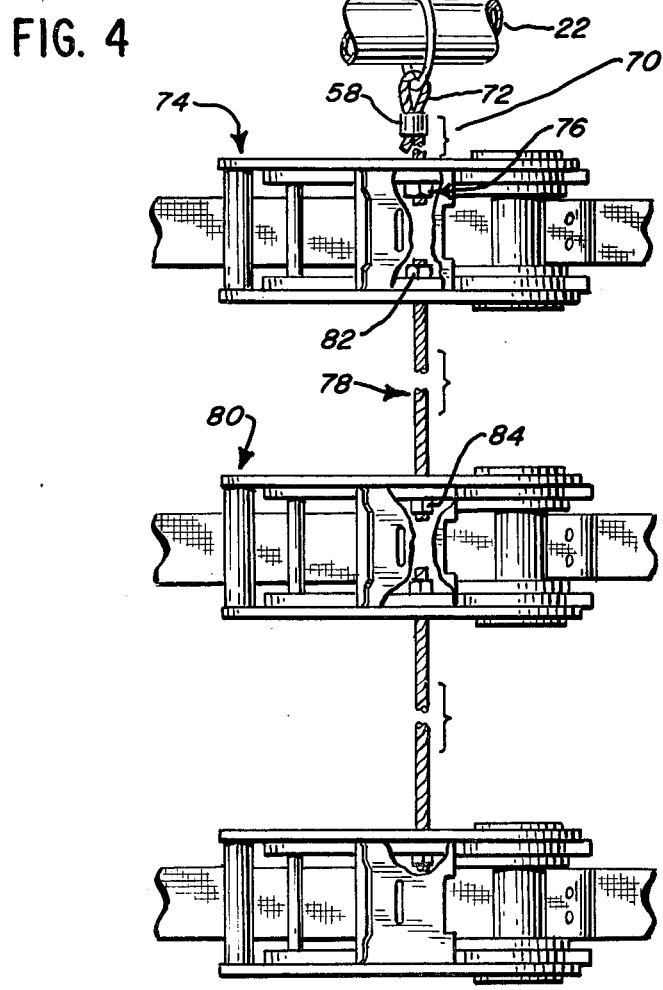

BUCKLE SUPPORTING AND ANTI-PILFERING ASSEMBLY

BACKGROUND OF THE INVENTION

This invention relates to lading-restraining devices, and more particularly, to the type which include a curtain and lading-restraining belts.

One form of a curtain-type lading-restraining device for use in lading-carrying vehicles, such as truck trailers, is disclosed in U.S. Pat. No. Re. 28,788. Improved forms of curtain-type lading-restraining devices are also known.

These devices generally include an overhead support system which extends laterally between the side-walls of a trailer or other containers in which goods are shipped and which is longitudinally movable therein. A lading-engaging curtain is suspended from the overhead support and is provided with a plurality of vertically-spaced, laterally-extending, belt-receiving pockets. The pockets include left- and right-hand sections with a central space therebetween. A plurality of lading-restraining belts are provided and one belt is positioned within and carried by each pocket. The ends of each belt are provided with sidewall engaging means and a buckle or ratchet-like tensioning device for tensioning or tightening the belt after the ends have been secured to the sidewalls. The buckle is positioned in the central space between the left- and right-hand sections.

The buckles, in addition to being useful with lading-restraining devices, are useful for other purposes. Persons desiring to use the buckles for such other purposes have removed the buckles by cutting the belt on either side of the buckle. This renders the lading-restraining device unusable until the entire belt is replaced, results in undesirable down time, and results in substantial maintenance and repair costs.

It is therefore an object of this invention to prevent or deter theft of buckles used on lading-restraining devices.

The buckles are made of metal so that when the belt is not tightened, as for example when the device is not in use, the buckle hangs downwardly and the lower edges of the belt bear against the lower inner edges of the pocket sections. This can cause some undesirable tearing or ripping of the pocket at the lower and inner edges.

It is therefore another object of this invention to support the buckles in a manner such that damage to the pocket, due to the weight of the buckle, is prevented.

These and other objects will become apparent from the following description and appended claims.

SUMMARY OF THE INVENTION

There is provided by this invention a buckle support system by which the buckles are interconnected in a manner which deters theft of the buckles and in a manner whereby the weight of the buckles are carried by the overhead support and not by the pockets so as to reduce damage to the pockets.

The system includes a continuous cable, or alternatively, cable segments, which is suspended from the overhead support, and which interconnects each buckle. Stop sleeve members are crimped to the cable and engage and support the buckles so that their weight is carried through the cable.

BRIEF DESCRIPTION OF THE DRAWINGS

FIG. 3 is a fragmentary elevational view showing a buckle, the overhead support and a continuous cable for supporting the buckle; and FIG. 4 is a fragmentary elevational view showing the alternate cable supporting system which includes a series of cable segments.

DESCRIPTION OF THE PREFERRED EMBODIMENT

Figure 1:
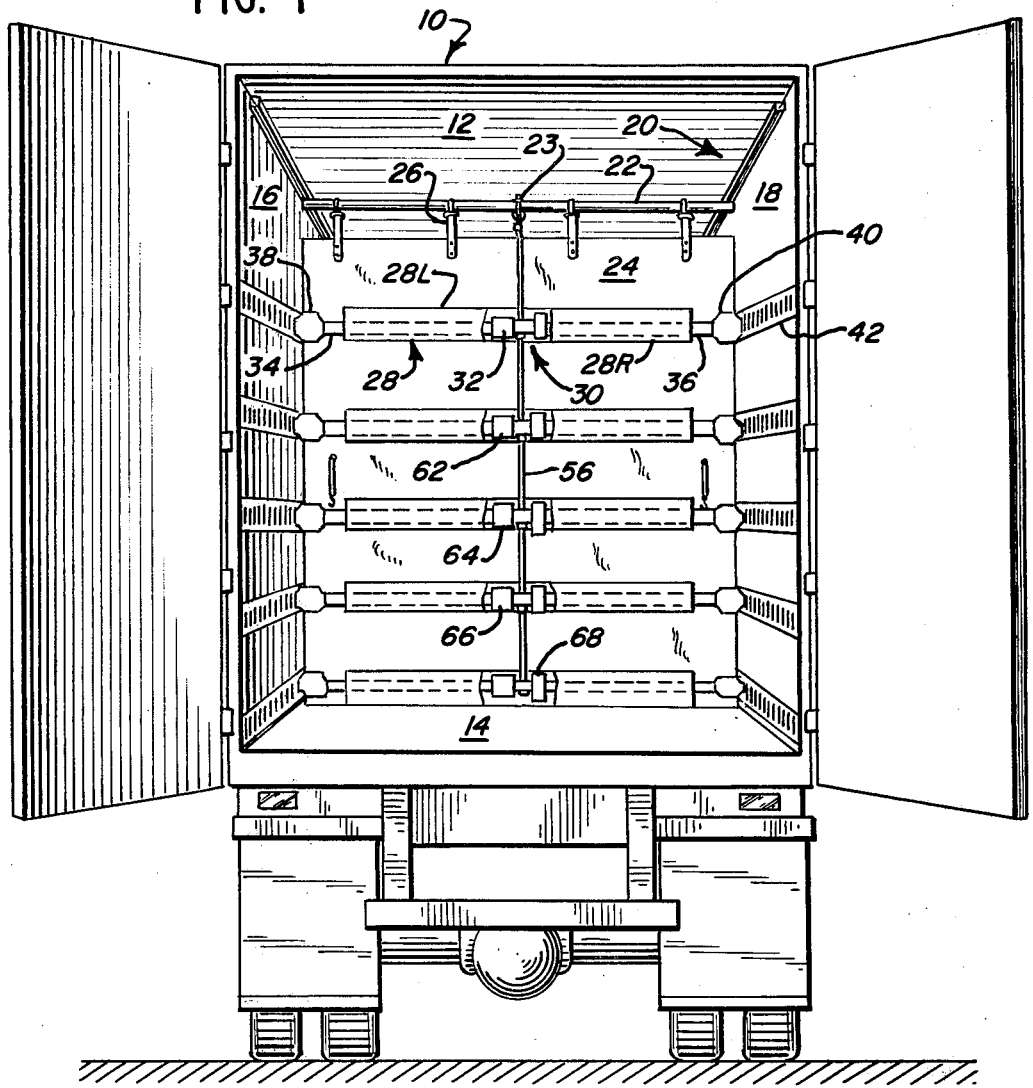
FIG. 1 is a perspective view showing the rear of a trailer with the lading-restraining device in the lading-engaging position, and showing the cable buckle support system.

Referring now to the drawings, there is shown a truck trailer 10, which includes a top wall 12, a bottom wall 14 and sidewalls 16 and 18. A laterally-extending and longitudinally-movable overhead support system 20 is positioned adjacent the top wall 12 and includes a support bar 22. A cable connecting ring 23 is positioned on the support and is movable along the length of the bar.

A lading-engaging curtain 24 is suspended from the bar 22 by a plurality of hangers, such as 26. In this particular embodiment, five vertically-spaced, laterally-extending, belt-receiving pockets, such as 28, are provided on the rearward side of the curtain. Each pocket, such as 28, includes left- and right-hand sections, such as 28L and 28R, which define a buckle-receiving space between their inner edges.

Five lading-restraining belts, such as 30, are provided, and each belt is carried in one of the pockets. The belt includes: a centrally positioned buckle 32; web or belting portions 34 and 36 which extend from the buckle toward the sidewalls through the pockets; and sidewall-engaging means or hooks 38 and 40, which are secured to the belting at each end. Five pairs of belt rails, such as 42, are provided in the sidewalls for engagement by the hooks at the ends of each belt.

The buckle 32 is commercially available and includes a frame 44, a rachet assembly 45, a winding handle 46 for operating the rachet and tightening the belt, and a release 48 for loosening the tightened belt. The frame 44 as seen in FIG. 3 includes top and bottom plates 50 and 52, each of which is provided with cable-receiving apertures 54 and 55.

Figure 2:
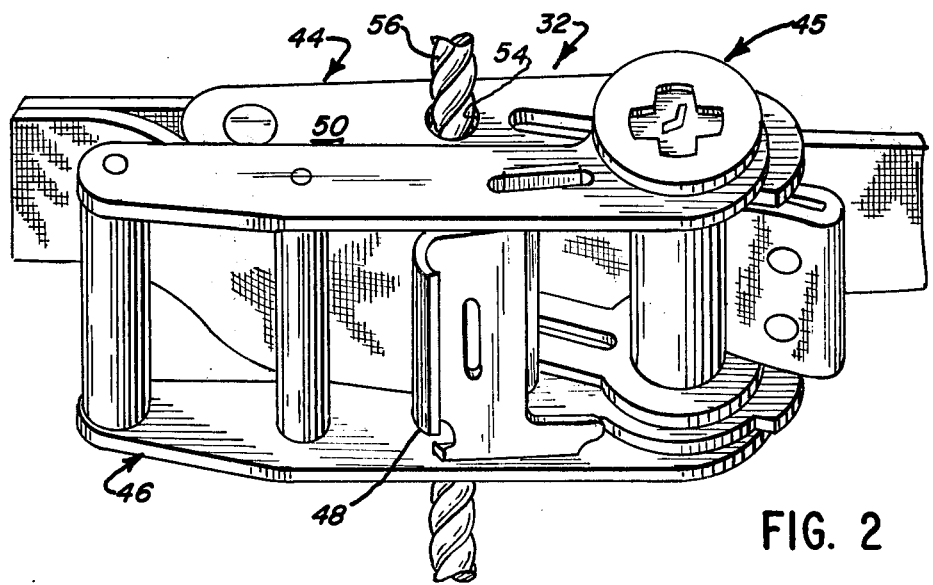
FIG. 2 is an enlarged perspective view of a buckle and a portion of the cable.

Referring now to FIGS. 1, 2 and 3, each buckle, such as 32, is supported from the overhead support 22 by a continuous, wire rope, cable 56 that extends from the support, through each buckle and terminates below the bottom buckle.

A loop is formed at the uppermost end of the cable 56 and the loop passes through the connecting ring 23 on the support 22 so that the cable is connected to the bar 22 through the ring 23. The loop is secured by a splicing sleeve 58. The cable then passes through the buckle 32 via the apertures 54 and 55 in the upper and lower plates. A stop sleeve 60 is crimped or secured to the cable at a position below the buckle so as to support and carry the weight of the buckle 32 and prevent it from causing the belting 34 and 36 from bearing against the inner lower edges of the pocket sections 28L and 28R.

As seen in FIG. 1, the cable extends downwardly through each of the lower buckles 62, 64, 66 and 68 and each is supported by a stop sleeve, such as 60, which is crimped to the cable below each buckle. Thus, through the crimped stop sleeves, the cable 56 and the ring 23, the weight of all of the five buckles is carried by the overhead support 22.

This arrangement deters theft of the buckles, since in order to obtain a buckle, it is necessary to cut the belting, such as 34 and 36, on either side of the buckle and then sever the wire rope cable above each buckle. If only one section of the cable is severed, for example the portion above the top buckle 32, then only the top buckle 32 can be removed since the next lower buckle 62 is positioned between the upper crimped sleeve 60 and the sleeve supporting the adjacent lower buckle 62.

An alternative buckle support arrangement is shown in FIG. 4. In this construction, separate cable segments are used to connect the top buckle to the support 22 and adjacent lower buckles to each other. The upper cable segment 70 includes a loop 72 for connection to the ring 23 and support 22 and the segment 70 extends into the buckle 74 through a hole in the top plate. A stop sleeve 76 is crimped to the lower end of the cable segment so that the weight of the buckle 74 is carried by the support 22 through the cable segment 70 and ring 23.

Another cable segment 78 is provided for supporting the adjacent lower buckle 80. The segment 78 has an upper stop sleeve 82 crimped at its upper end and the segment 78 passes through the upper buckle 74, so that the stop sleeve 82 is positioned within and engages the buckle 74. The cable segment 78 enters the buckle 80 and has a lower stop sleeve 84 crimped at its lower end. Thus the weight of buckle 80 is carried by the support 22 through the cable segment 78, the buckle 74, the cable segment 70 and the ring 23.

Each of the lower buckles are carried in the same manner. Thus the weight of the buckles is carried by the support through the cable segments. In order to remove the buckles, it is necessary to cut the associated belts as well as the cable segments above and below each buckle.

It will be appreciated that numerous changes and modifications can be made to the embodiments disclosed herein without departing from the spirit and scope of this invention.

What is claimed and desired to be secured by Letters Patent of the United States is:

1. A lading-restraining device for use in lading-carrying vehicles and containers which have top, bottom, and side walls, said side walls including at least one belt rail said device adapted to restrain the movement of lading and including:
   a laterally-extending and longitudinally-movable overhead support positioned adjacent said top wall;
   curtain means suspended from said support for engaging an unrestrained face of said lading, and including means defining a plurality of vertically-spaced and laterally-extending belt-receiving pockets on one side thereof,
   a plurality of vertically-spaced and laterally-extending restraining belt means, each positioned within a pocket, said belt means having sidewall-engaging means at each end for engaging a belt rail, and buckle means positioned therebetween for tightening said belt means,
   wherein the improvement comprises therebeing further provided buckle-support and pilferage-resistant means cooperatively associated with each buckle means for spacedly supporting each said buckle means from an overhead support and from other buckle means and for interconnecting each buckle means with an adjacent buckle means.

2. A lading-restraining device as in claim 1, wherein said buckle-support and pilferage-resistant means includes cable means secured at one end to said overhead support and constructed to support each of said buckle means.

3. A lading-restraining device as in claim 2, wherein said cable means extends from said overhead support to the lowermost buckle means and means are provided on said cable means for engaging and supporting each of said buckle means.

4. A lading-restraining device as in claim 3, wherein said cable means passes through each of said buckle means and each of said buckle-engaging means comprise a sleeve member fitted about said cable and secured thereto at a position below each of said buckle means.

5. A lading-restraining device as in claim 2, wherein said cable means includes a plurality of cable segments, with a first segment extending from said support to the uppermost buckle means, for supporting said uppermost buckle means, and each additional cable segment extending from an upper buckle means to the adjacent lower buckle means so that the adjacent lower buckle means is supported from the upper buckle means and so that all buckle means are carried by the overhead support.

6. A lading-restraining device as in claim 5, wherein each of said buckle means includes an upper and a lower plate, and each buckle is supported through a cable segment which extends through said upper plate and a sleeve member which is secured to said cable means and engages the upper plate, and wherein cable segments extend downwardly from the lower plate of an upper buckle means for supporting an adjacent lower buckle means.

* * * * *